US012753850B2

(12) United States Patent
Fischer

(10) Patent No.: US 12,753,850 B2
(45) Date of Patent: Oct. 6, 2026

(54) VALVE ASSEMBLY AND MOUNTING PLATE COMPRISING A VALVE ASSEMBLY

(71) Applicant: BUERKERT WERKE GmbH & CO. KG, Ingelfingen (DE)

(72) Inventor: Florian Fischer, Ingelfingen (DE)

(73) Assignee: Buerkert Werke GmbH & Co. KG, Ingelfingen (DE)

( * ) Notice: Subject to any disclaimer, the term of this patent is extended or adjusted under 35 U.S.C. 154(b) by 32 days.

(21) Appl. No.: 18/907,912

(22) Filed: Oct. 7, 2024

(65) Prior Publication Data

US 2025/0122946 A1 Apr. 17, 2025

(30) Foreign Application Priority Data

Oct. 12, 2023 (DE) ......................... 102023127955.6

(51) Int. Cl.
*F16K 27/00* (2006.01)
*F15B 13/08* (2006.01)

(52) U.S. Cl.
CPC ........ *F16K 27/003* (2013.01); *F15B 13/0821* (2013.01); *F15B 13/0817* (2013.01)

(58) Field of Classification Search
CPC ................ F16K 27/003; F15B 13/0821; F15B 13/0817; F15B 13/0825; F15B 13/0828; F15B 13/0835
See application file for complete search history.

(56) References Cited

U.S. PATENT DOCUMENTS 4,230,143 A * 10/1980 Dettmann ........... F15B 13/0896 137/884
5,459,953 A * 10/1995 Fukano ............... F15B 13/0839 137/884
6,328,070 B2 * 12/2001 Clayton .................. E21B 34/04 137/271
8,235,067 B2 * 8/2012 Gagne ....................... F16K 7/07 137/315.07
8,783,295 B2 * 7/2014 Igarashi ................ F16K 27/003 137/271
9,625,049 B2 * 4/2017 Starzmann .......... F15B 13/0857
(Continued)

FOREIGN PATENT DOCUMENTS

DE 69933899 T2 5/2007
DE 102017106676 A1 10/2018
(Continued)

*Primary Examiner* — Michael R Reid
(74) *Attorney, Agent, or Firm* — McNees Wallace & Nurick LLC

(57) ABSTRACT

A valve assembly includes at least two fluid valves which are placed next to each other along a direction of alignment and each have a driving side and a fluid side. Each valve includes a fluid connection unit which extends along the direction of alignment over the fluid side of the fluid valves. The fluid connection unit is composed of at least two connection blocks each of which extends along the direction of alignment over the fluid valves and is provided with fluid connections. Each connection block is mechanically connected to the adjacent connection block and to the fluid valves, and the connection blocks are configured as injection-molded parts, and the mold parting plane of a connection blocks extends through the fluid connections of this connection block.

8 Claims, 10 Drawing Sheets

(56) References Cited

U.S. PATENT DOCUMENTS

| | | | | |
|---|---|---|---|---|
| 9,910,446 | B2 * | 3/2018 | Hamm ................ | F15B 13/0825 |
| 2013/0269791 | A1 | 10/2013 | Herrmann et al. | |

FOREIGN PATENT DOCUMENTS

| | | | |
|---|---|---|---|
| DE | 102013103545 | B4 | 2/2019 |
| DE | 202022104099 | U1 | 9/2022 |
| EP | 1767839 | B1 | 7/2010 |

* cited by examiner

VALVE ASSEMBLY AND MOUNTING PLATE COMPRISING A VALVE ASSEMBLY

FIELD OF DISCLOSURE

The present disclosure relates to a valve assembly including at least two fluid valves and a fluid connection unit composed of at least two connection blocks which are designed as injection-molded parts, and to a mounting plate comprising a valve assembly.

BACKGROUND

The prior art discloses valve assemblies comprising a plurality of fluid valves, the fluid valves being fluidically connected to hoses via a common fluid connection unit. The fluid connection unit thus serves as a connecting piece between the hoses and the fluid valves. The fluid connection unit typically has a plurality of fluid connections to which the hoses can be attached. The fluid connections are often arranged in several rows which run parallel to each other, one fluid connection of the fluid connection unit being assigned to each fluid inlet or fluid outlet of the fluid valve.

Various methods can be used to manufacture fluid connection units, one of which is injection molding. Injection molding is relatively cost-effective and easy to carry out, but has the disadvantage that the molded part, i.e. the fluid connection unit, has to be demolded from a two-part injection mold after manufacture. Any of type of undercuts, i.e. elements of the molded part which are not formed in the main demolding direction, are disruptive when demolding molded parts. If sliders have to be used on the injection mold to be able to produce unavoidable undercuts, the costs for the injection mold increase considerably.

A one-piece fluid connection unit comprising a plurality of fluid connections, which are arranged, as usual, in several rows running parallel to each other, has numerous such undercuts. This makes the injection molding of a one-piece fluid connection unit very expensive.

To be able to injection mold fluid connection units nevertheless, these are divided into a plurality of sub-units, each sub-unit being injection molded separately. For example, the fluid connection unit can be divided into a base block and the fluid connections, both the base block and all fluid connections being injection molded separately. These subunits are then assembled, welded to each other and the connecting points sealed so that they together form a fluid-tight fluid connection unit.

However, both the manufacturing of numerous individual parts and the assembly, connecting and sealing is complex, time-consuming and costly. Furthermore, each joint carries the risk of leakage.

The object of the present disclosure is therefore to provide an improved valve assembly comprising a fluid connection unit which is injection molded and overcomes the disadvantages known from the prior art, as well as a mounting plate comprising a valve assembly.

Summary According to example embodiments, the object is achieved by a valve assembly comprising at least two fluid valves, which are placed next to each other in a direction of alignment and each have a drive side and a fluid side. The valve assembly also has a fluid connection unit, which extends over the fluid side of the fluid valves along the direction of alignment and rests thereagainst. The fluid connection unit is composed of at least two connection blocks, each of which extends over the fluid valves along the direction of alignment and is provided with fluid connections. The fluid connections can be used, for example, to connect hoses through which a fluid enters the fluid connection unit and the fluid valves. Each connection block is mechanically connected to the adjacent connection block and to the fluid valves. The connection blocks are designed as injection molded parts, the mold parting plane of a connection block running through the fluid connections of this connection block.

In other words, the at least two fluid valves are arranged next to each other in a row in a direction of alignment, whereas the at least two connection blocks are arranged one above the other, i.e. perpendicular to the direction of alignment. Therefore, each connection block is in contact with both fluid valves and extends simultaneously over the at least two fluid valves. A fluid valve is therefore always in contact with at least two connection blocks.

This has the advantage that a valve assembly comprising more than two fluid valves which are adjacent to each other in the direction of alignment also only requires (at least) two connection blocks. Thus, regardless of the number of fluid valves, only one fluid connection unit with (at least) two connection blocks is required.

The number of connection blocks depends on the type of fluid valves and not on the number of fluid valves. More specifically, the number of connection blocks depends on the number of fluid passages, i.e. fluid inlets and outlets of a fluid valve. For fluid valves which are designed as 2-way valves and have two fluid passages, the fluid connection unit consists of two connection blocks. If the fluid valve is a 3/2-way valve, the fluid connection unit consists of three connection blocks. According to the present disclosure, one row of fluid passages of several fluid valves thus always interacts with one connection block.

The design of the connection blocks with several fluid connections, all arranged in a row next to each other, makes it possible to form the connection block in one piece and to injection mold the latter, since the mold parting plane can be placed such that it runs through the fluid connections of this connection block and thus no undercuts are formed. It is no longer necessary to injection mold numerous individual parts separately and then assemble them to provide a fluid connection unit. The fluid connection unit according to the present disclosure has the advantage that it consists of fewer individual parts and consequently also has fewer connection points and sealing points.

The only connecting point of the fluid connection unit is a resting surface on which the two connection blocks rest against each other and are mechanically connected to each other. However, no fluid is conducted through this connecting point, so that no additional sealing is required. The two connection blocks may be connected to each other, for example, by screws, hooks, pins, rivets and/or clamps, as well as combinations thereof.

The fluid valves used may be solenoid valves, in particular flange valves.

According to one aspect of the present disclosure, the connection blocks may be provided with hooks which engage in openings of the adjacent connection block. The hooks serve to reversibly couple the two connection blocks to each other and to firmly connect them in a mechanical manner so that unintentional displacement and/or disconnection of the connection blocks is not possible.

The hooks can be designed as snap hooks which engage elastically in an undercut of the adjacent connection block, thus ensuring a particularly secure hold. In addition, the elasticity of the snap hook allows the connection of the two connection blocks to be released without damaging them, for example to replace one of the two connection blocks.

According to the present disclosure, the connection blocks may be provided with reciprocal stops. These reciprocal stops are formed laterally on the connection blocks as webs and extend in the direction of the other connection block. They ensure that the two connection blocks are correctly mounted, for example to prevent one connection block from protruding over the other. An offset of the two connection blocks relative to each other would have the consequence that the fluid connections of the two connection blocks are no longer arranged exactly one under the other and can no longer be placed congruently on the fluid passages of the fluid valves. This would cause the connection between the fluid connection unit and the fluid valve to leak, which has to be prevented.

According to a further aspect of the present disclosure, the connection blocks may be provided with complementary engagement formations. These engagement formations are, in particular, at least one protruding web and/or at least one projection and/or at least one pin on one of the connection blocks and a complementary groove and/or a complementary recess on the adjacent connection block. The engagement formations facilitate assembly and serve to guide the two connection blocks during assembly and to align them in a correct arrangement on top of each other and to fix them there if necessary. Similar to the stops, the two connection blocks ensure that the connection blocks are not offset from each other in any direction, so that the fluid connections are arranged directly above each other.

An engagement formation in the form of a web ensures that the two connection blocks have a guide in the direction of alignment (in the x-direction) when they are pushed into each other. If the connection blocks have engagement formations in the form of a pin and a complementary recess, it is ensured that the two connection blocks can only be plugged together in a single alignment in the y-direction. An engagement formation in the form of a projection, for example in the form of a dovetail, allows the two connection blocks to be mounted in a mounting direction which lies in the z-direction. The mounting direction of the connection blocks thus depends on the type and design of the engagement formation.

The connection blocks can be connected to each other in a direction transverse to the direction of alignment via at least one stiffening element. The stiffening elements serve to additionally stabilize the connection of the two connection blocks and also prevent the connection blocks from being displaced relative to each other in different directions. The stiffening elements may be designed as screws and/or pins, which are arranged in stiffening element holders on a side of the connection blocks facing away from the fluid valves. The stiffening elements are arranged between two fluid connections perpendicular to the direction of alignment.

According to the present disclosure, the fluid connections may be designed as connection fittings extending away from the corresponding connection block. Hoses may be attached to the connection fitting, through which a fluid, in particular a liquid, is conducted to the valve assembly. The shape and design of the connection fittings depends on the fluid valve used and the hose connected thereto.

The fluid connections of all connection blocks run in the same direction and each project from the connection blocks in the same direction. The fluid connections are formed integrally with the connection block by means of the injection-molded connection block. As a result, the fluid connections do not have to be attached to the fluid connection unit as separate parts, and in particular they do not have to be screwed, clamped and/or ultrasonic-welded, so that on the one hand the assembly effort is reduced and on the other hand a connection which is always fluid-tight is ensured, as the connecting point is eliminated.

According to a further aspect of the present disclosure, the connection blocks are equipped with valve seats on their side facing the fluid valves. The fluid passages of the fluid valves adjoin these valve seats, so that a continuous fluid channel is formed by the connection blocks and the fluid valves. The valve seats are sealed in a fluid-tight manner with the fluid valves.

The multi-partitioning of the fluid connection unit makes it possible to arrange additional elements between the two connection blocks. According to the invention, a screw opening may extend transversely through one of the connection blocks, at the end of which that faces the adjacent connection block a nut, in particular a hex nut, is arranged. The nut is arranged between the two connection blocks so as to not fall out when separating the connection blocks from each other. In particular, the nut is located in a hexagonal recess, which is formed in one of the two connection blocks and is shaped complementarily to the outer contour of the nut. The nut is mounted in the connection block with very little play. Due to shape of the recess which is complementary to the outer contour of the nut, and the nut, an additional tool is not required to hold the nut in position when inserting a screw. In addition, the nut offers the advantage that no threaded bush has to be inserted into the mold before injection molding and/or that a threaded bush has to be subsequently inserted into the fluid connection unit by ultrasound, heat and/or screwing.

According to the present disclosure, a mounting plate comprising a valve assembly is also provided, a screw opening extending transversely through a connection block, at the end of which that faces the adjacent connection block a nut is arranged, a fastening screw extending through the mounting plate and the screw opening into the nut. According to the present disclosure, the valve assembly can thus be fixed to the mounting plate by means of a fastening screw. The fastening screw extends in the screw opening offset to the fluid connections arranged one above the other, so that the fastening screw does not extend through the fluid channel. The mounting plate may also be a part of a machine or system, so that the fluid unit can be mounted directly on the machine or the system.

BRIEF DESCRIPTION OF THE DRAWINGS

Further advantages and features of the invention will become apparent from the following figures, to which reference is made and in which.

DETAILED DESCRIPTION

Figure 1:
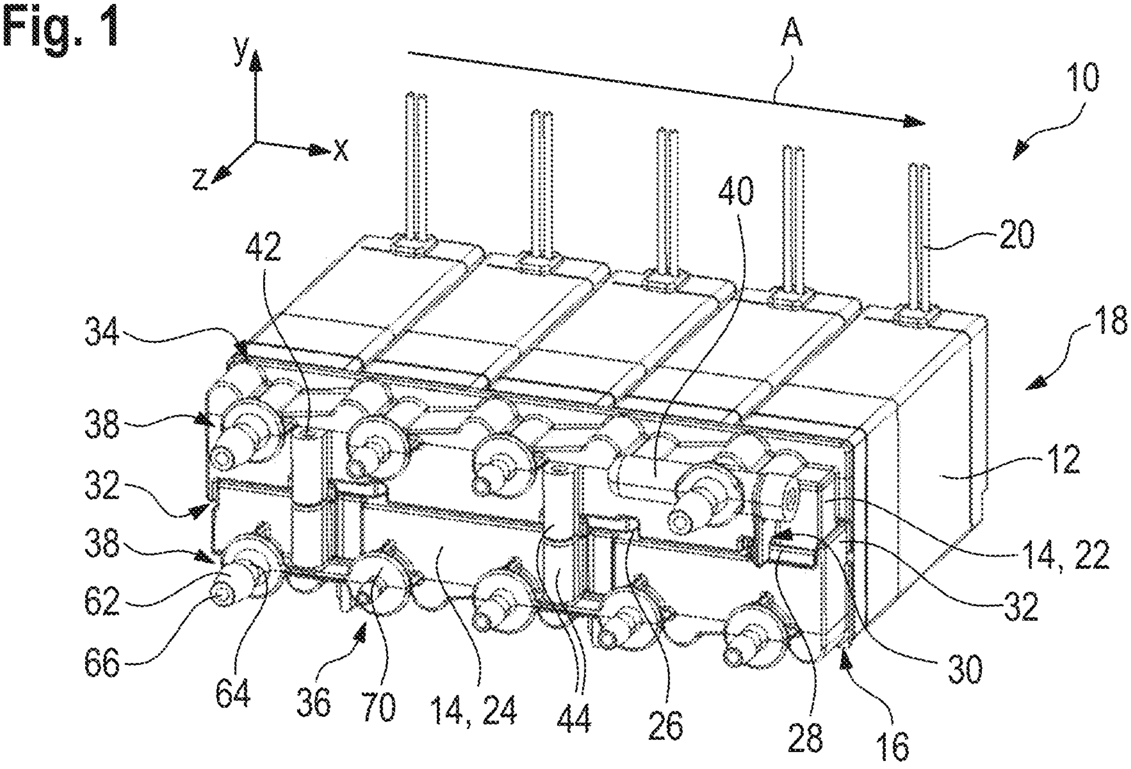
FIG. 1 shows a perspective front view of a valve assembly according to an example embodiment with a fluid connection unit consisting of two connection blocks and five fluid valves.

FIG. 1 shows a valve assembly 10 having five fluid valves 12 and a fluid connection unit 14 attached thereto.

Figure 3:
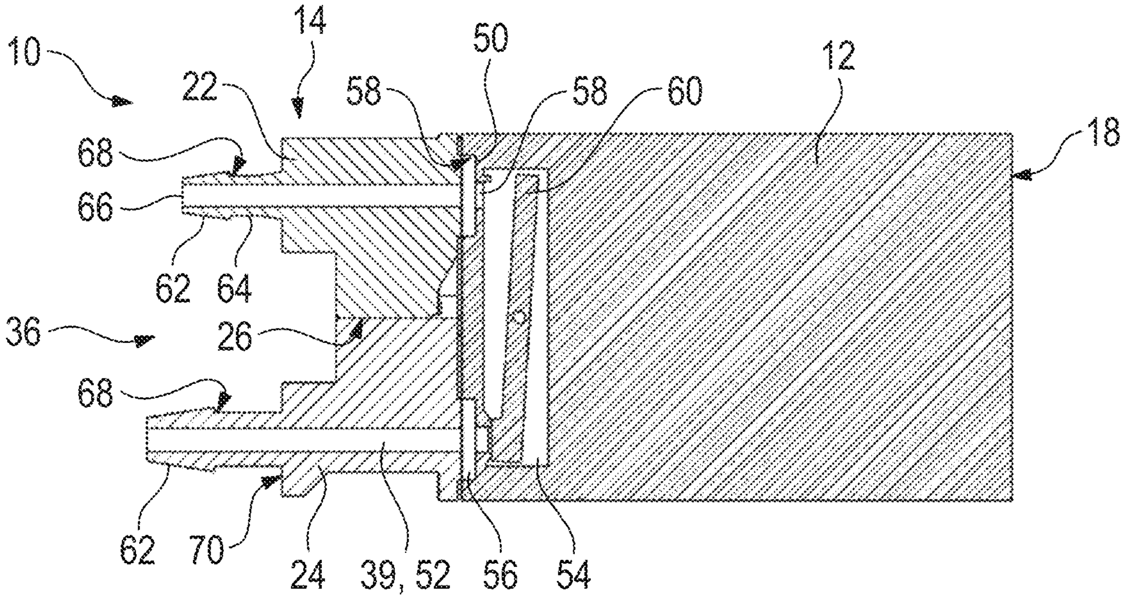
FIG. 3 shows a schematic cross-sectional view of the valve assembly of FIG. 1.
Figure 4:
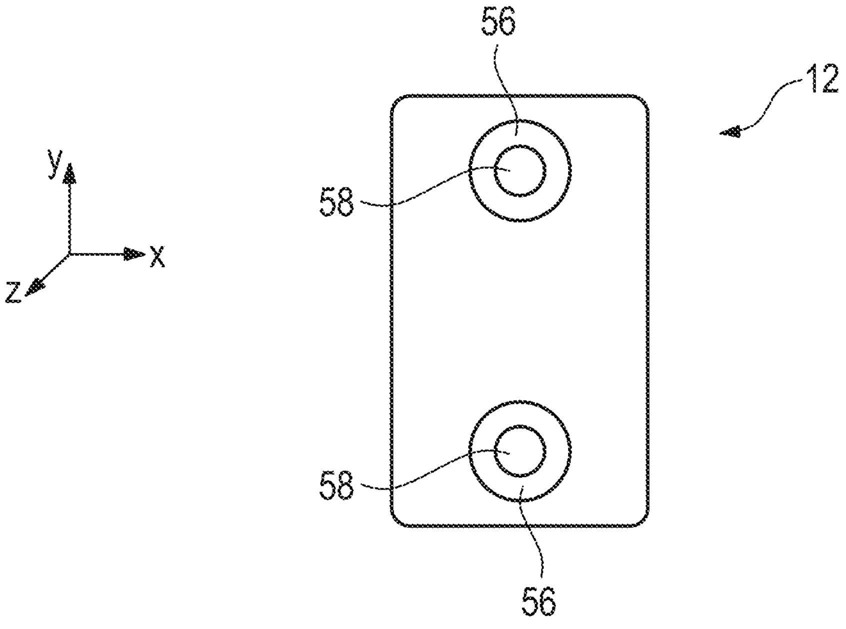
FIG. 4 shows a schematic front view of a fluid valve of FIG. 1.

The fluid valves 12 are designed as solenoid valves, in particular as flange valves, and are shown and described in more detail in FIGS. 3 and 4.

The fluid valves are designed as two-way valves and have a fluid inlet and a fluid outlet on one fluid side 16, through which a fluid can flow into or out of the fluid valve 12. The fluid valves 12 thus have two fluid passages, each of which can serve as a fluid inlet or as a fluid outlet.

The five fluid valves 12 are arranged next to each other, adjacent to each other along a direction of alignment A, which corresponds to the x-direction, and are aligned such that one fluid passage is respectively arranged at the top and a second fluid passage is respectively arranged at the bottom. The fluid passages are thus arranged above the other perpendicular to the direction of alignment A.

The fluid valves 12 each have a drive side 18, which is located opposite the fluid side 16 and on which a drive and/or a control unit (neither of which is shown) can be attached.

The fluid valves 12 can be activated via electric lines 20. In particular, each fluid valve 12 has a separate line 20 via which it can be controlled independently of the other fluid valves 12.

The fluid valves 12 are in contact with the fluid connection unit 14 via the fluid side 16 and are mechanically coupled in a reversible manner to the fluid connection unit 14.

The fluid connection unit 14 consists of a first connection block 22, which is arranged in the y-direction above a second connection block 24. The two connection blocks 22, 24 are injection molded and rest against each other on a resting surface 26 and are at least partially in contact with each other.

At this resting surface 26, the two connection blocks 22, 24 are mechanically and reversibly connected to each other by means of engagement formations.

The resting surface 26 has a plurality of engagement formations in the form of a web 28 and a complementary groove 30. The web 28 is formed in one piece with the second connection block 24, so that the latter is a male connection block. The groove 30 is located in the first connection block 22, making this a female connection block.

The web 28 and the groove 30 interact with each other so that the first connection block 22 is guided by the web 28 of the second connection block 24 in the direction of alignment A when assembling the fluid connection unit 14.

In addition, the first connection block 22 and the second connection block 24 each have reciprocal stops 32. These prevent, for example, the first connection block 22 from being pushed too far onto the second connection block 24 and from projecting therefrom.

These stops 32 are attached laterally to each connection block 22, 24 and extend in the y-direction, so that in an assembled state, the first connection block 22 contacts the stop 32 of the second connection block 24 and the second connection block 24 contacts the stop 32 of the first connection block 22.

The connection blocks 22, 24 each have a side 34 facing the fluid valves 12 and a side 36 facing away from the fluid valves 12.

Via the side 34 facing the fluid valves 12, the connection blocks 22, 24 are in contact with the fluid valves 12, more precisely with the fluid side 16 of the fluid valves 12.

The first connection block 22 and the second connection block 24 are arranged so as to extend along the direction of alignment A over the fluid side 16 of the fluid valves 12. Thus, both the first connection block 22 and the second connection block 24 are in contact with all five fluid valves 12. The fluid valves 12 and the connection blocks 22, 24 are aligned perpendicular to each other 36.

On the side 36 facing away from the fluid valves 12, each connection block 22, 24 has a plurality of fluid connections 38, which are designed as connection fittings. A hose, through which a fluid can be conducted can be connected to each fluid connection 38.

A straight fluid channel section 39 is formed inside the fluid connections 38 and extends into the connection blocks 22, 24. The straight fluid channel section 39 is perpendicular to the side 34 of the connection blocks 22, 24 facing the fluid valves 12.

The straight fluid channel sections 39 of all fluid connections 38 run parallel to each other.

The fluid connections 38 are arranged so as to lie next to each in a row. Each connection block 22, 24 thus has a single row of fluid connections 38.

The shape and size of the fluid connections 38 and of the straight fluid channel sections 39 can vary as desired and be adapted for the respective application. The fluid connections 38 of a connection block 22, 24 do not have to be uniformly designed, either, so that two adjacent fluid connections 38 can have completely different sizes, shapes or diameters. The exact structure of the fluid connections 38 is explained later with reference to FIG. 3.

The first connection block 22 has a total of four fluid connections 38, whereas the second connection block 24 has a total of five fluid connections 38.

The first three fluid connections 38, viewed from left to right, are located directly above each other in a perpendicular arrangement in the first connection block 22 and the second connection block 24. An imaginary connection between the fluid connections 38 is thus perpendicular to the direction of alignment A.

In contrast thereto, the fluid connections 38 arranged on the right side of the fluid connection unit 14 are not arranged directly above each other, since the first connection block 22 on the right has only one fluid connection 38, whereas the second connection block 24 on the right has two fluid connections 38 arranged next to each other.

One fluid connection 38 of the first connection block 22 is arranged substantially in the center above the two fluid connections 38 of the second connection block 24. The fluid connection 38 is thus in fluid communication with two fluid valves 12.

To distribute a fluid between the two fluid valves 12, the first connection block 22 has a horizontal fluid channel section 40 adjoining the fluid connection 38, via which the fluid can be simultaneously conducted in the direction of alignment A to two adjacent fluid valves 12.

Also on the side 36 of the connection blocks 22, 24 which faces away from the fluid valves 12, these have stiffening elements 42, which are arranged between two fluid connections 38 on the side 36 of the connection blocks 22, 24 which faces away from the fluid valves 12.

The stiffening elements 42 are designed as two pins which are attached perpendicular to the direction of alignment in stiffening element holders 44 and additionally stiffen the connection between the two connection blocks 22, 24.

The stiffening element holders 44 are attached from the outside to the connection blocks 22, 24 on a side 36 facing away from the fluid valves 12, or are formed integrally therewith. They are located between two fluid connections 38 and are arranged such that, in an assembled state, they form a continuous channel for the stiffening elements 42.

Figure 2:
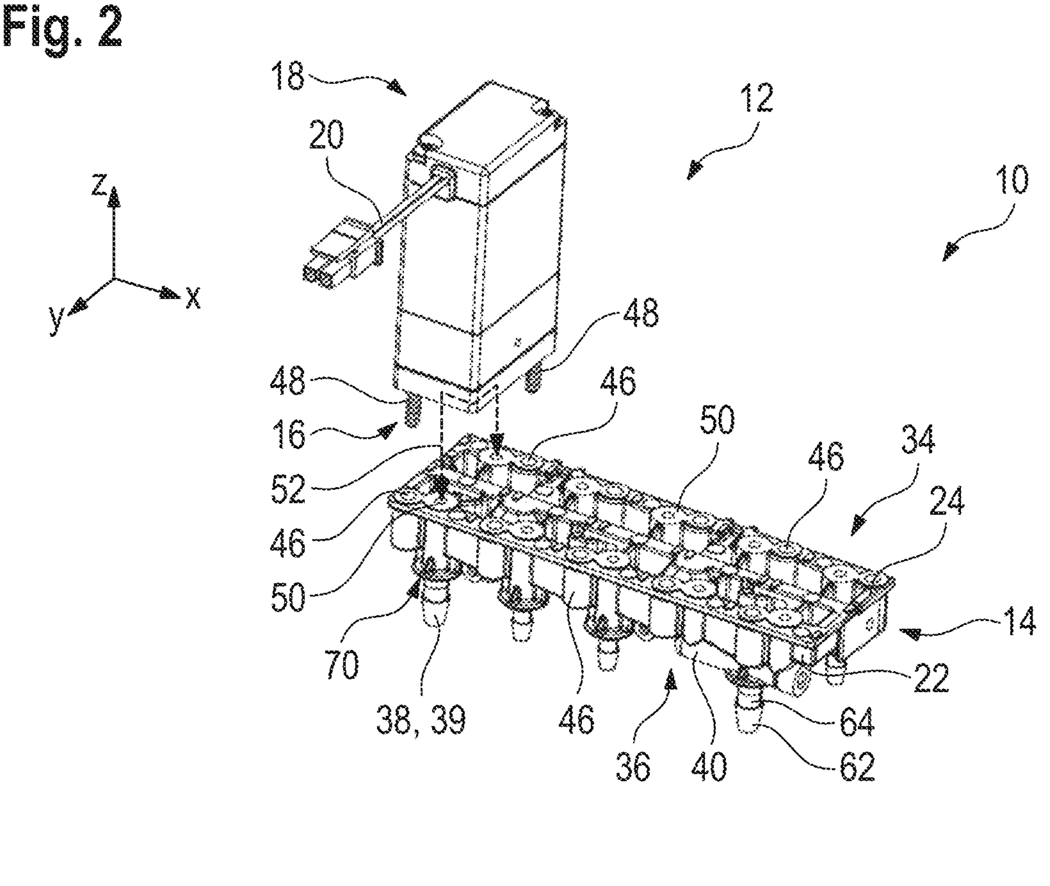
FIG. 2 shows a perspective rear view of the fluid connection unit of FIG. 1, consisting of two connection blocks which have several valve seats on their side facing the fluid valves.

FIG. 2 shows an isometric rear view of a fluid connection unit 14 with a fluid valve 12 arranged thereabove, which can be fastened on the fluid connection unit 14 and can thus be mechanically connected thereto.

Each fluid valve 12 has a cylindrical valve pin 48 in the area of at least two opposite corners, which can be received in the receptacles 46 of the connection blocks 22, 24. In this way, each fluid valve 12 is connected to the first connection block 22 and the second connection block 24.

For this purpose, the connection blocks 22, 24 have a plurality of cylindrical receptacles 46. The cylindrical receptacles 46 are designed perpendicular to the side 34 facing the fluid valves 12, and the valve pins 48 are perpendicular to the fluid side 16 of the fluid valves 12.

The valve pins 48 have a thread so that the fluid valves 12 can be firmly screwed to the connection blocks 22, 24. This ensures a particularly firm hold of the fluid valves 12 in the connection blocks 22, 24.

The straight fluid channel sections 39 are arranged next to the receptacles 46 for the valve pins 48.

The straight fluid channel sections 39 are surrounded by valve seats 50, which are formed on the side 34 of the connection blocks 22, 24 which faces the fluid valves 12.

In particular, the valve seats 50 are configured such that, after a fluid valve 12 has been plugged on the fluid connection unit 14 or attached thereto, a fluid-tight connection is formed between the fluid valves 12 and the fluid connection unit 14.

After having mounted the fluid valve 12 on the fluid connection unit 14, a continuous fluid channel 52 is formed which extends through the connection blocks 22, 24 and the fluid valves 12.

Such a continuous fluid channel 52, formed by the fluid connection unit 14 and the fluid valves 12, is indicated as an example by a dashed line in FIG. 2.

The continuous fluid channel 52 is only formed when the connection blocks 22, 24 are attached to the fluid valves 12. In other words, the connection blocks 22, 24 themselves do not have a closed fluid channel through which a fluid is introduced on one side and a fluid is discharged on the other side.

As can also be clearly seen in FIG. 3, the continuous fluid channel 52 runs from the fluid connections 38 through the first connection block 22 or the second connection block 24 into the fluid valves 12 and from there out of the valve assembly 10 via the second connection block 24 or the first connection block 22 and the fluid connections 38 of the corresponding connection block 22, 24.

The continuous fluid channel 52 is thus composed of two straight fluid channel sections 39, optionally of one or more horizontal fluid channel sections 40 and a valve chamber 54 of the respective fluid valve 12.

To seal the connection between the fluid connection unit 14 and the fluid valves 12, the fluid valves 12 can have sealing elements 56, such as ring seals, in the area of the connection.

When the fluid connection unit 14 is attached to the fluid valve 12, the fluid connection unit 14 contacts via the valve seat 50 the sealing element 56 of the fluid valves, so that a fluid-tight connection if formed between the fluid valves 12 and the fluid connection unit 14, in particular a fluid-tight connection is formed between the straight fluid channel sections 39 and fluid passages 58 of the fluid valve 12.

A switching element 60 in the form of a rocker is arranged in the interior of the valve chamber 54, which, depending on its activation, blocks and seals a fluid passage 58 of the fluid valve 12. The switching element 60 can be used to set whether fluid is conducted through the continuous fluid channel 52, i.e. whether the fluid valve 12 is open or closed.

The switching element 60 is driven and controlled by a control and drive device (not shown), which is located on the drive side 18 of the fluid valve 12.

The valve shown is thus a solenoid valve, in particular a flange valve.

The cross-sectional view of the valve assembly 10 also clearly shows the shape of the fluid connections 38 in FIG. 3.

The fluid connections 38 are designed in one piece with the connection blocks 22, 24. They consist of two different sections, a first section 62 and a second section 64.

The first section 62 is the section of the fluid connections 38 that is furthest away from the fluid valves 12.

The first section 62 has a conical outer contour which defines a connection opening 66 at one end. The cone of the first section 62 is designed to widen towards the side 34 facing the fluid valves 12, so that a hose coming from the connection opening 66 is first pushed onto the first section 62 easily and with increasing difficulty as it is further pushed thereon. The outer contour of the first section 62 is thus designed to be conically tapered from the side 34 facing the fluid valves 12 to the side 36 of the fluid valves 12 facing away from the fluid valves 12.

The diameter of the connection opening 66 corresponds to the constant diameter of the straight fluid channel sections 39.

A second section 64 is arranged between the first section 62 and the connection block 22, 24. The external diameter of the second section 64 is smaller than the external diameter of the first section 62 on the side 34 of the first section 62 facing the fluid valves 12.

A projection or undercut section 68 is thus formed on the first section 62.

The connection blocks 22, 24 also have hose stops 70, against which a hose which has been pushed onto the first section 62 and the second section 64 of the fluid connections 38 strikes.

FIG. 4 shows the fluid side 16 of a 2-way fluid valve 12 with two fluid passages 58, around each of which a sealing element 56 designed as a ring seal is arranged.

The two fluid passages 58 are arranged directly above each other, they are thus not offset relative to each other. In other words, the two valve passages are perpendicular to each other.

Figure 5:
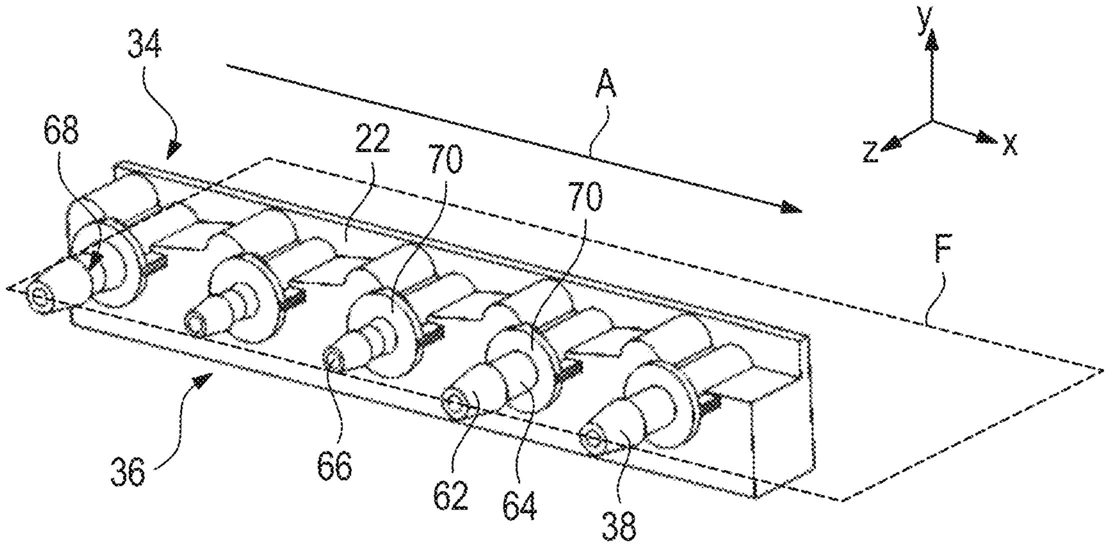
FIG. 5 shows a perspective front view of a connection block according to an example embodiment with five fluid connections.
Figure 6:
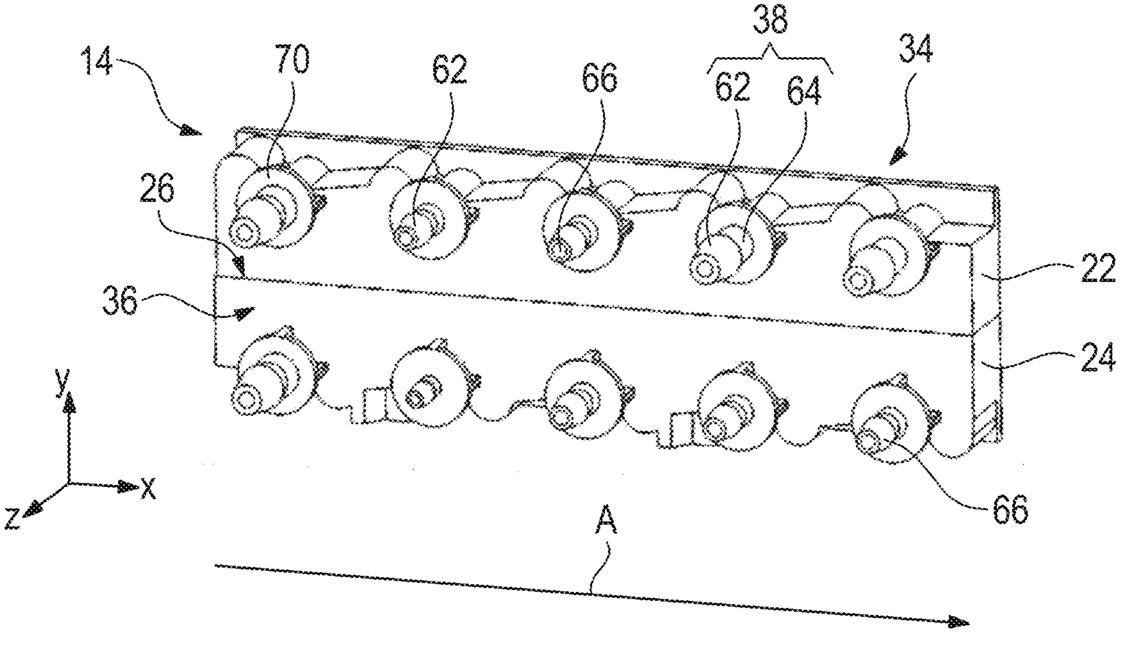
FIG. 6 shows a perspective front view of a valve connection unit of FIG. 1 with two connection blocks.
Figure 7:
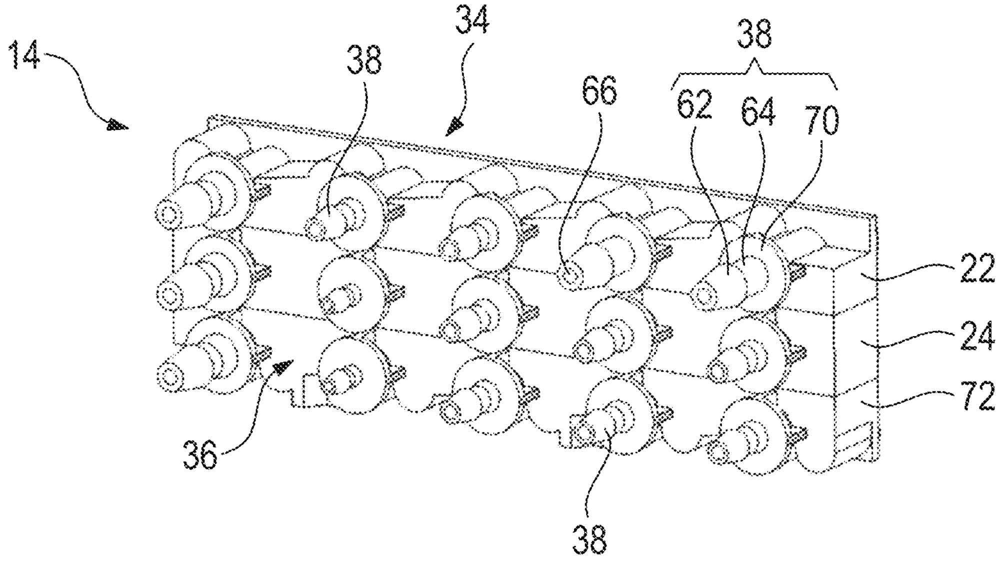
FIG. 7 shows a perspective front view of a fluid connection unit according to the invention consisting of three connection blocks, each with five fluid connections arranged one above the other.

FIGS. 5 to 7 show an integrally formed connection block 22 and a plurality of connection blocks arranged one above the other, which together form a fluid connection unit 14.

The connection block 22 of FIG. 5 represents the connection element 22, based on which the fluid connection units 14 of FIGS. 6 and 7 are manufactured.

The connection block 22 of FIG. 5 has five fluid connections 38 arranged in a row next to each other. The mold parting plane F, which is indicated by a dashed line, runs centrally through the fluid connections 38.

The arrangement of the mold parting plane through the center of the fluid connections 38 makes it possible to injection mold the connection blocks 22, 24 and then to remove them from the mold. If a connection block 22, 24 had several rows of fluid connections 38 running parallel to each other, it would not be possible to remove them from the mold due to the undercut of the part between the fluid connection rows.

This connection block 22 is arranged together with a second connection block 24 one above the other, so that the fluid connection unit 14 of FIG. 6 is formed.

The fluid connection unit 14 of FIG. 6 is suitable for being coupled to a 2-way fluid valve 12, so that each fluid connection 38 of the connection blocks 22, 24 can be coupled to one of the two fluid passages 58 of the 2-way fluid valve 12.

The fluid connection unit 14 shown in FIG. 7 consists of three connection blocks 22, 24, 72 and is therefore designed for a 3/2-way fluid valve 12.

The third connection block 72 is designed in exactly the same way as the first connection block 22 or the second connection block 24.

The only special feature of a fluid connection unit 14 having a plurality of connection blocks 22, 24, 72 is that the center connection block 24 has two resting surfaces 26 having two engagement formations so that it can be mechanically connected both to the first connection block 22 and to the third connection block 72. The connection between the connection blocks is established by means of engagement formations and/or hooks.

FIGS. 6 and 7 show that the number of connection blocks 22, 24, 72 included in the fluid connection unit 14 depends only on the fluid valve 12 connected thereto.

In the case of a 2-way valve, the fluid connection unit 14 consists of a first connection block 22 and a second connection block 24, whereas in the case of a 3/2-way valve, the fluid connection unit 14 must consist of a first connection block 22, a second connection block 24 and a third connection block 72 so that a fluid connection 38 can be assigned to each fluid passage 58.

In other words, the number of connection blocks 22, 24, 72 of the fluid connection unit 14 depends on how many fluid passages 58 the fluid valve 12 has.

FIGS. 8 to 13 show various embodiments of engagement formations and provide possibilities for mechanically connecting two connection blocks 22, 24 to each other. In each of the embodiments shown in the three figures, the assembly direction M in which a first connection block 22 is plugged or pushed onto a second connection block 24 is different. It is conceivable that several engagement formations can also be combined.

The connection of the connection blocks 22, 24 is again releasable so that individual connection blocks 22, 24 can be replaced if necessary without having to replace the entire fluid connection unit 14.

Figure 8:
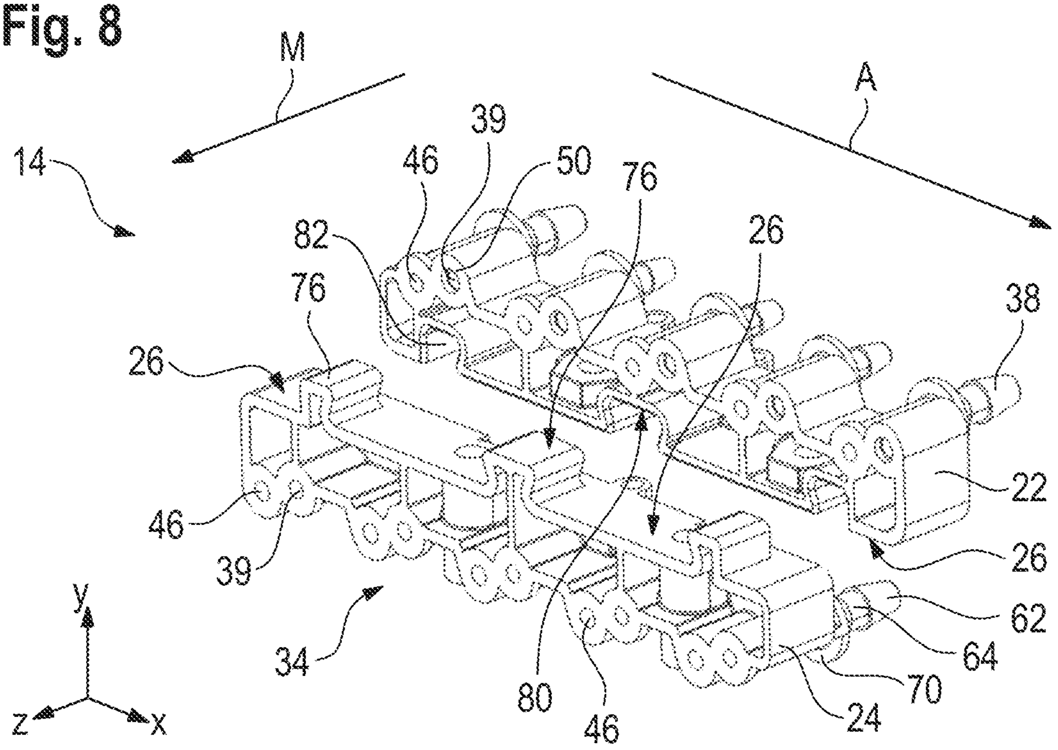
FIG. 8 shows a perspective rear view of a fluid connection unit according to an example embodiment consisting of two connection blocks with three engagement formations designed as projections.

FIG. 8 shows a first connection block 22 and a second connection block 24, which can be pushed into each other in the z-direction perpendicular to the direction of alignment A and thus form a fluid connection unit 14. The assembly direction thus corresponds to the z-direction.

To this end, the first connection block 22 has recesses 74, while the second connection block 24 has matching complementary projections 76. The first connection block 22 is thus a female connection block and the second connection block 24 is designed as a male connection block. Of course, the first connection block 22 can also be designed as a male connection block and the second connection block 24 as a female connection block.

The projections 76 and recesses 74 extend along the z-direction, so that it is impossible for the connection blocks 22, 24 to be displaced relative to each other along the direction of alignment A in the x-direction.

The projections 76 have the shape of a dovetail and are in particular designed so as to form a resting surface 78 on the side facing the first connection block 22, which is in communication with a bottom 80 of the recess 74.

The bottom 80 of the recess 74 is larger than a recess opening 82 opposite the bottom 80. This can prevent the first connection block 22 in FIG. 8 from being removed upwards, i.e. in the y-direction.

Disassembly of the fluid connection unit 14 can only take place in the assembly direction M, i.e. in the z-direction, which is perpendicular to the direction of alignment A.

Figure 9:
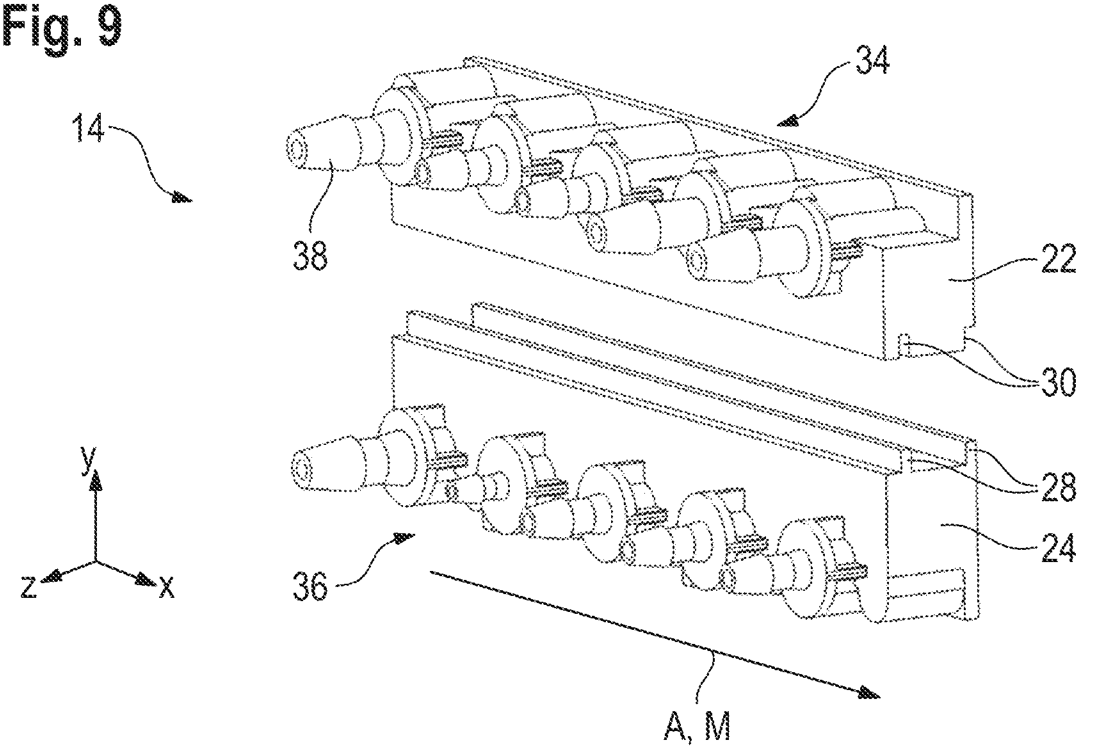
FIG. 9 shows a perspective front view of an fluid connection unit according to an example embodiment consisting of two connection blocks with two engagement formations designed as webs.

In FIG. 9, the first connection block 22 and the second connection block 24 are also pushed onto each other, but in this case, the assembly direction M coincides with the direction of alignment A. The two connection blocks 22, 24 are thus mounted in the direction of alignment A, i.e. in the x-direction.

The first connection block 22 has a groove 30 and the second connection block 24 has a complementary web 28. Both the groove 30 and the web 28 extend over the entire length of the connection blocks 22, 24. It is of course also possible that, for example, the web 28 is subdivided into several partial areas, so that a connection block 22, 24 has more than one web or more than one groove.

To simplify the assembly of the first connection block 22 and the second connection block 24, the second connection block 24 has a second web 28, which is flush with the side 34 of the second connection block 24 facing the fluid valves 12. The first, female connection block 22 has a matching second groove 30.

Both webs 28 of the second connection block 24 represent a guide for the first connection block 22.

In this embodiment, the connection blocks 22, 24 can be disassembled both in the x-direction and in the y-direction, as the webs 28 have a constant thickness. Disassembly is not possible only in the z-direction towards the front.

Figure 10:
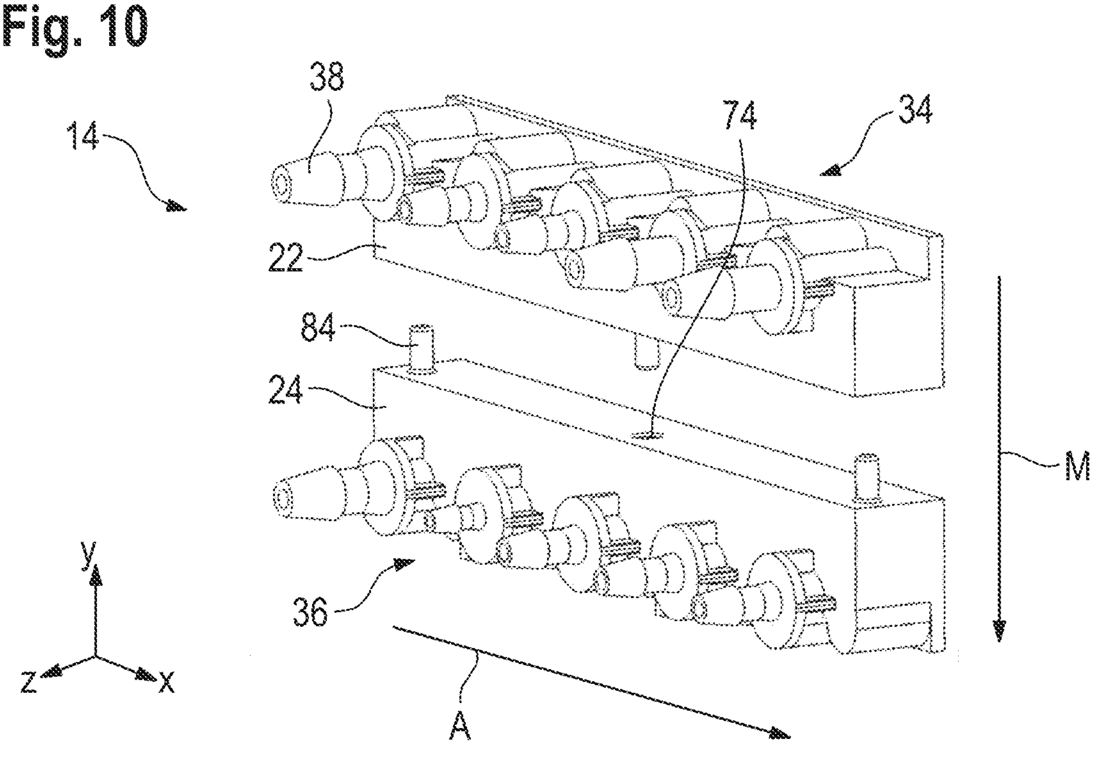
FIG. 10 shows a perspective front view of a fluid connection unit according to an example embodiment consisting of two connection blocks with three engagement formations designed as pins.

FIG. 10 shows a third possible embodiment for mounting a first connection block 22 on a second connection block 24.

For this purpose, both the first connection block 22 and the second connection block 24 have pins 84 which extend into complementary recesses 74 of the respective opposite connection block 22, 24. The first connection block 22 can be plugged onto the second connection block 24 from above in the y-direction using the pins 84. The assembly direction M is thus in the y-direction.

The pins 84 can be used to prevent the two connection blocks 22, 24 from being displaced relative to each other in the x and z directions. Disassembly can only occur in the y direction.

Figure 11:
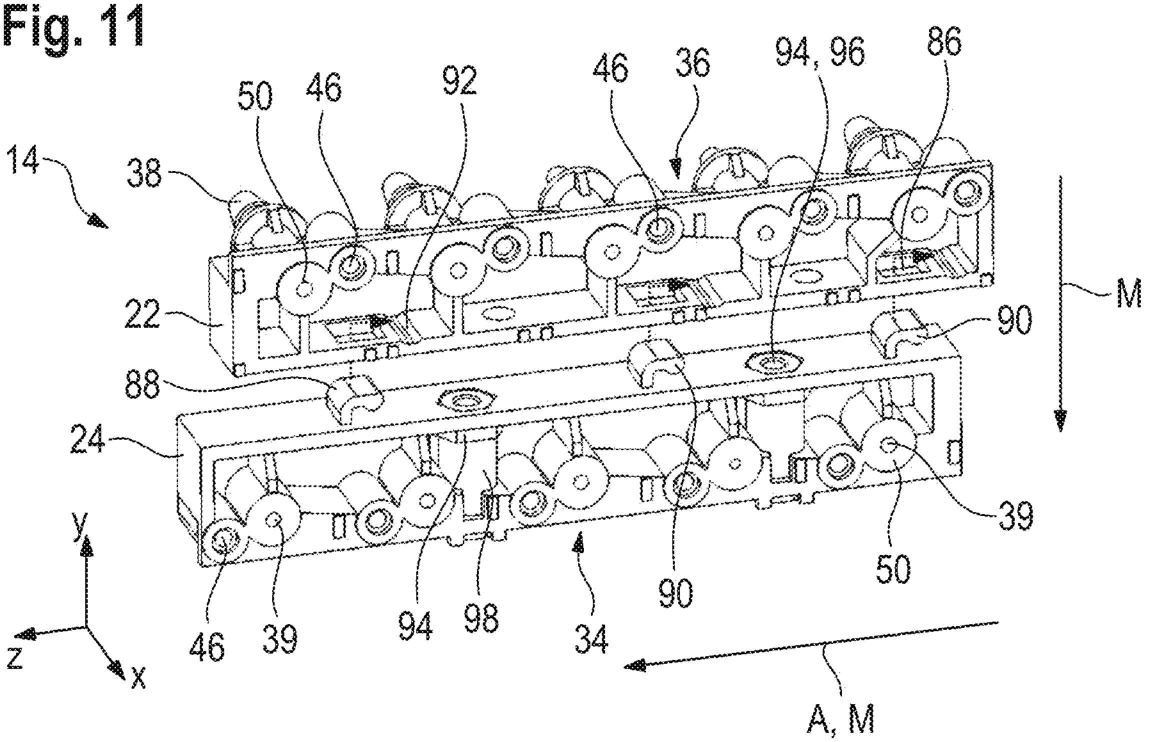
FIG. 11 shows a perspective rear view of a fluid connection unit according to an example embodiment consisting of two connection blocks and three hooks designed as snap hooks in a non-assembled state.
Figure 12:
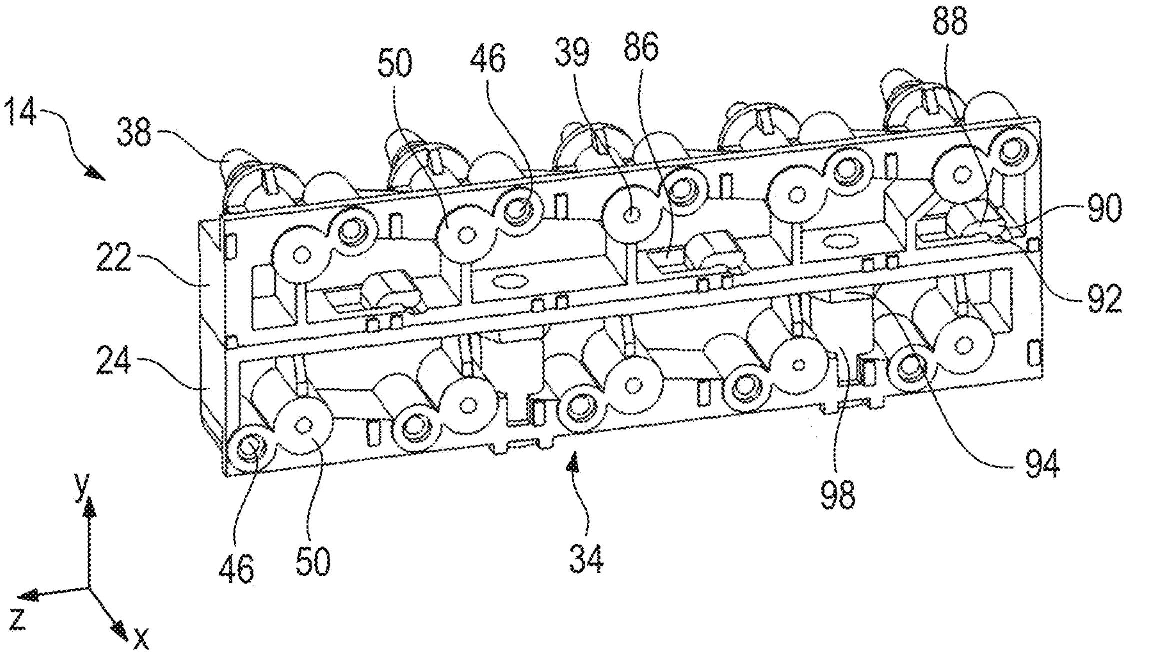
FIG. 12 shows a perspective rear view of the fluid connection unit of FIG. 11 in an assembled state.
Figure 13:
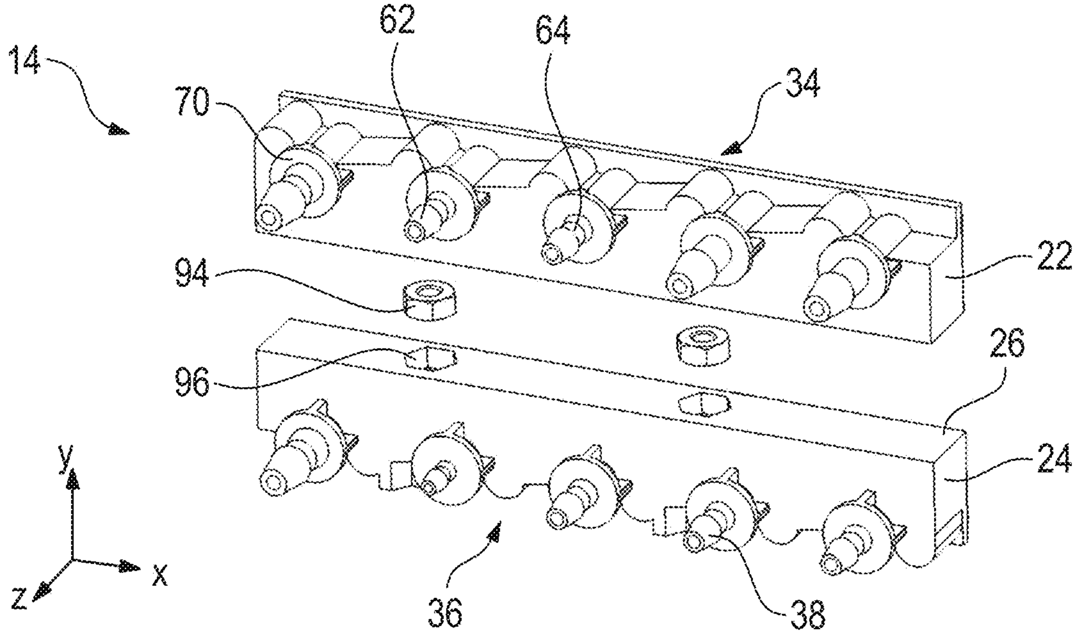
FIG. 13 shows a perspective front view of a fluid connection unit according to an example embodiment with two connection blocks and two nuts in one of the two connection blocks.

FIGS. 11 and 12 show a fourth possibility how a first connection block 22 can be connected to a second connection block 24 in a mechanically releasable manner.

For this purpose, the first connection block 22 has openings 86 into which hooks 88 of the second connection block 24 can be inserted. The hooks 88 are designed as snap hooks and have a thickened portion 90 at one end of the hook 88.

For assembly, the hook 88 is positioned under the opening 86 and then guided in the y-direction through the opening 86. After that, the two connection blocks 22, 24 are displace relative to each other in the x-direction until the thickened portion 90 of the hook 88 engages elastically in an undercut 92 located in the first connection block 22 next to the opening 86 in the x-direction.

The engagement of the thickened portion 90 in the undercut 92 prevents the two connection blocks 22, 24 from being displaceable relative to each other in the direction of alignment A after assembly.

FIG. 12 shows the fully assembled fluid connection unit 14 consisting of the two connection blocks 22, 24 of FIG. 11. The thickened portion 90 has engaged in the undercut 92, so that the two connection blocks 22, 24 are firmly connected to each other.

As shown in FIGS. 11 through 14, the second connection block 24 can receive a hexagonal nut 94.

The nut 94 is arranged at the end of the connection block 24 facing the adjacent connection block 22. It is therefore located between the first connection block 22 and the second connection block 24, but is substantially completely received in the second connection block 24, so that it is almost flush with the resting surface 26 of the second connection block 24.

The nut 94 is received in a recess 96, which is also configured to be hexagonal and prevents the nut 94 from rotating about its center axis.

Figure 14:
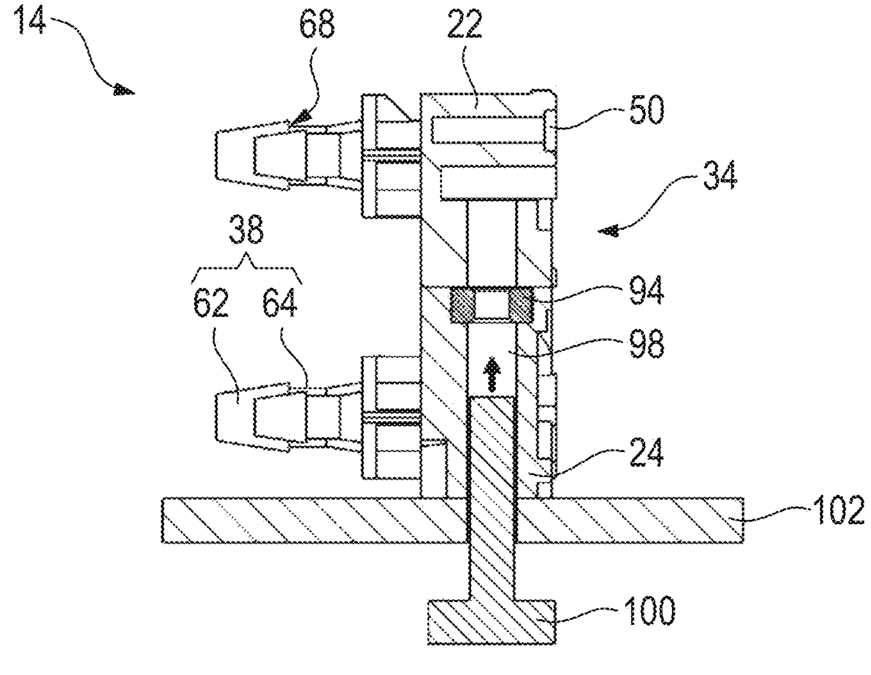
FIG. 14 shows a schematic cross-sectional view of a fluid connection unit according to an example embodiment which is attached on a mounting plate by means of a fastening screw.

As can be clearly seen in FIG. 14, a screw opening 98 is present in one of the connection blocks 22, 24, in particular in the second connection block 24. The screw opening 98 extends right through the second connection block 24 and opens into the recess 96 for the nut 94.

In particular, the screw opening 98 has no thread, since the nut 94 already has an (internal) thread in which a fastening screw 100 can engage.

The fluid connection unit 14 can be fastened to a mounting plate 102 by means of the fastening screw 100.

To this end, the fluid connection unit 14, in particular in the already assembled state, with the nut 94 arranged between the two connection blocks 22, 24, is placed on the mounting plate 102 and the fastening screw 100 is inserted from below through the mounting plate 102 into the screw opening 98 of the second connection block 24. As soon as the fastening screw 100 reaches the nut 94, it is screwed therein until the fluid connection unit 14 is firmly connected to the mounting plate 102.

The fastening screw 100 thus extends through the mounting plate 102 and the screw opening 98 of the second connection block 24 into the nut 94. However, it is also possible for the fastening screw 100 to extend further into the first connection block 22.

Figure 15:
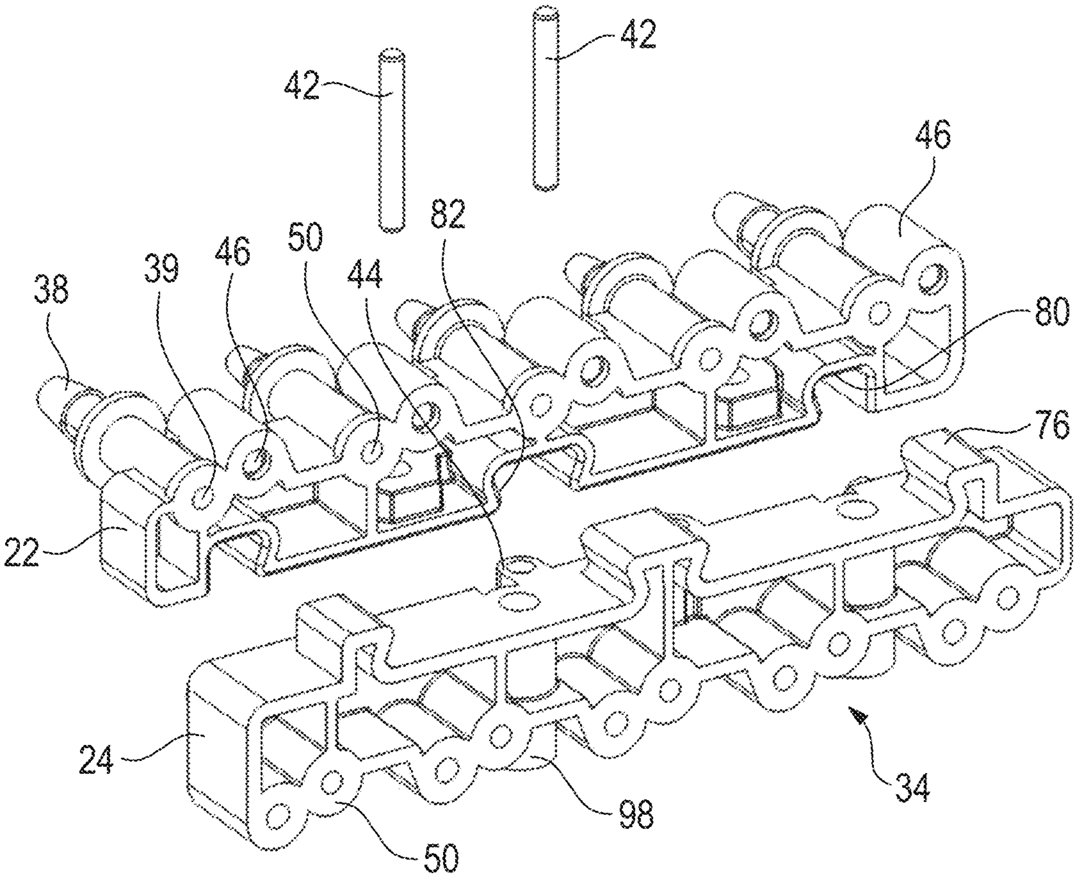
FIG. 15 shows a perspective rear view of a fluid connection unit according to an example embodiment consisting of two connection blocks with two stiffening elements in a disassembled state.
Figure 16:
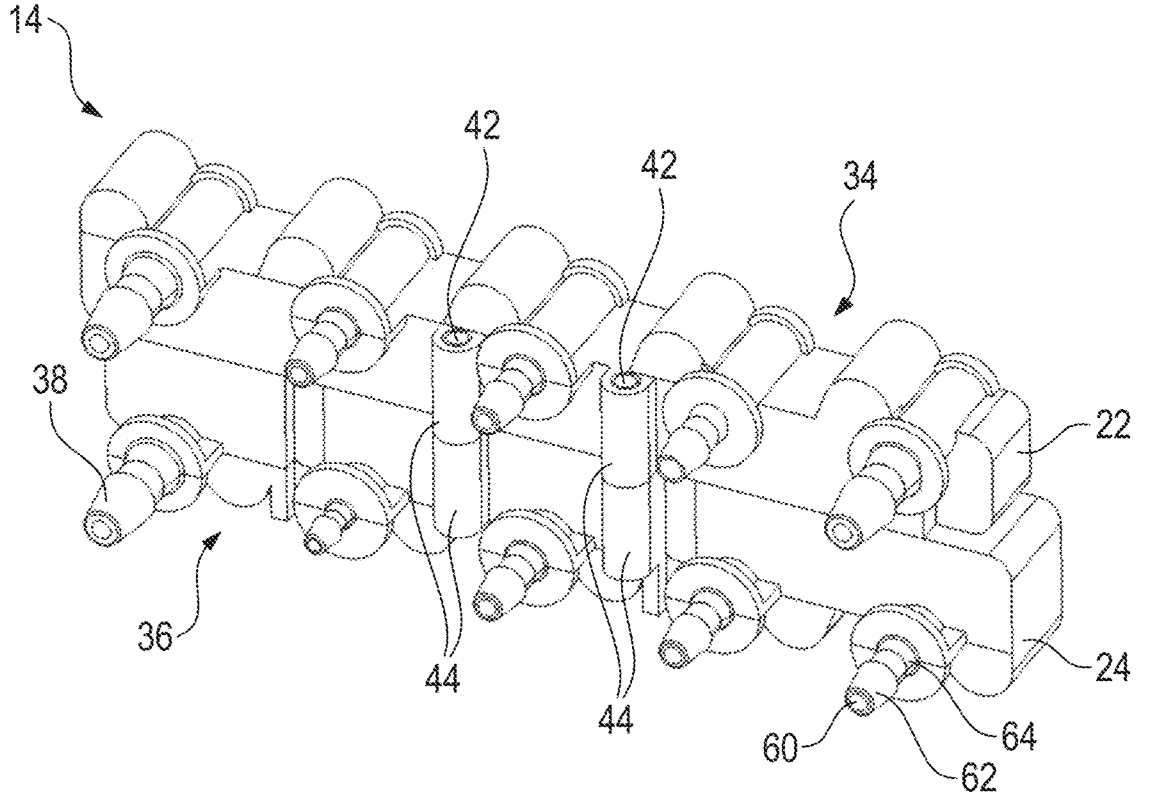
FIG. 16 shows a perspective front view of a detail of the fluid connection unit of FIG. 15 in an assembled state.
Figure 17:
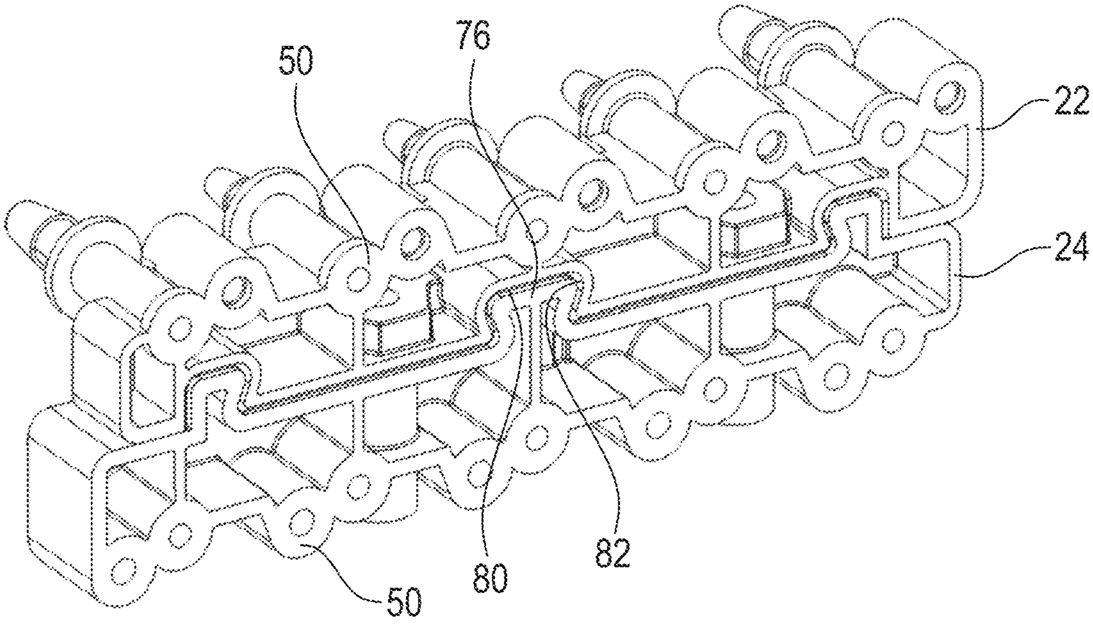
FIG. 17 shows a perspective rear view of a fluid connection unit according to an example embodiment consisting of two connection blocks with two stiffening elements in an assembled state.

FIGS. 15 and 16 show the stiffening elements 42 and the stiffening element holders 44 in detail.

The two connection blocks 22, 24 each have two cylindrical stiffening element holders 44 on the side 36 facing away from the fluid valves 12, forming a shaft. The stiffening element holders 44 can be designed as a single piece with the connection blocks 22, 24 or can be attached as separate elements.

To stiffen the connection blocks 22, 24 together, and after having connected the connection blocks 22, 24 to each other, stiffening elements 42 in the form of pins are inserted into the stiffening element holders 44 from above in the y-direction perpendicular to the direction of alignment A, until the stiffening elements 42 are completely received in the stiffening element holders 44.

For this purpose, the stiffening element holders 44 can have a stiffening element stop.

The stiffening elements 42 serve to prevent the connection blocks 22, 24 from being displaced in the direction of alignment A, i.e. in the x-direction and in the z-direction.

This is particularly important if the connection blocks 22, 24 have been mounted such that a movement in the direction of alignment A or in the z-direction is still possible. This always occurs when the first connection block 22 and the second connection block 24 are connected to each other by means of projections 76 or webs 28 and recesses 74 or grooves 30. If the connection blocks 22, 24 are connected to each other by means of hooks 88, the stiffening elements can be used to reduce the lateral load on the hooks 88.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A valve assembly, comprising:

at least two fluid valves which are placed next to each other along a direction of alignment A and each have a driving side and a fluid side, and a fluid connection unit which extends along the direction of alignment A over the fluid side of the at least two fluid valves, wherein the fluid connection unit is composed of at least two connection blocks each of which extends along the direction of alignment A over the at least two fluid valves and is provided with fluid connections, wherein each connection block is mechanically connected to the adjacent connection block and to the at least two fluid valves, wherein the connection blocks are configured as injection-molded parts, and a mold parting plane F of one of the connection blocks extends between the fluid connections in such a way that no undercuts are formed, and wherein the connection blocks are provided with valve seats on a side facing the at least two fluid valves.

2. The valve assembly of claim 1, wherein one of the connection blocks is provided with hooks which engage in openings of the adjacent connection block.

3. The valve assembly of claim 2, wherein the hooks are designed as snap hooks which engage elastically into an undercut of the adjacent connection block.

4. The valve assembly of claim 1, wherein the connection blocks are provided with reciprocal stops.

5. The valve assembly of claim 1, wherein the connection blocks are provided with complementary engagement formations, formed by at least one projecting web or at least one projection or at least one pin on one of the connection blocks and a complementary groove or a complementary recess on the adjacent connection block.

6. The valve assembly of claim 1, wherein the connection blocks are connected to each other via stiffening elements in a direction transverse to the direction of alignment A.

7. The valve assembly of claim 1, wherein the fluid connections are designed as connection fittings which extend away from the corresponding connection block.

8. The valve assembly of claim 1, wherein a screw opening extends transversely through one of the connection blocks and has a nut arranged at the end facing the adjacent connection block.

* * * * *